United States Patent [19]

Okamura

[11] Patent Number: 4,916,557

[45] Date of Patent: Apr. 10, 1990

[54] METHOD OF SHARING VARIOUS TYPES OF MEDIUM DRIVES AND RECORDING/REPRODUCTION APPARATUS WITH MEDIUM CONTROLLER FOR REALIZING THE METHOD

[75] Inventor: Hiroshi Okamura, Tokyo, Japan

[73] Assignee: Kabushiki Kaisha Toshiba, Kawasaki, Japan

[21] Appl. No.: 160,409

[22] Filed: Feb. 25, 1988

[30] Foreign Application Priority Data

Feb. 27, 1987 [JP] Japan .................................. 62-44523

[51] Int. Cl.⁴ .......................... G11B 5/09; G11B 15/12
[52] U.S. Cl. ......................................... 360/48; 360/60
[58] Field of Search ....................... 360/46, 60, 61, 68, 360/48

[56] References Cited

U.S. PATENT DOCUMENTS

| | | | |
|---|---|---|---|
| 4,122,306 | 10/1978 | Friedman et al. ..................... | 360/61 |
| 4,300,174 | 11/1981 | Harman et al. ........................ | 360/78 |
| 4,357,635 | 11/1982 | Hasegawa ............................ | 360/51 |
| 4,577,239 | 3/1986 | Sougen .................................. | 360/61 |
| 4,633,337 | 12/1986 | Horie et al. ........................... | 360/57 |
| 4,644,419 | 2/1987 | Iinuma et al. ......................... | 360/46 |
| 4,651,235 | 3/1987 | Morita et al. ......................... | 360/46 |
| 4,651,238 | 3/1987 | Ishikura ................................ | 360/48 |

OTHER PUBLICATIONS

"Barium Ferrite Perpendicular Recording Floppy Disk" by Imamura et al., Toshiba Review, No. 154, winter 1985, pp. 18-22.

*Primary Examiner*—Vincent P. Canney
*Attorney, Agent, or Firm*—Finnegan, Henderson, Farabow, Garrett and Dunner

[57] ABSTRACT

A magnetic recording/reproduction apparatus includes a first floppy disk drive (FDD) of a preerase head type, which includes a first read/write (R/W) section, and a second FDD of a tunnel erase head type, which includes a second R/W section. A selection signal generating section selectively outputs first and second selection signals generated in accordance with a write command for said first and second FDD. A mode signal supplying section outputs a mode signal generated in accordance with the write command to a write gate (WG) signal generating section. A sync signal generating section generates a sync signal from a read data (RD) signal from the first or second R/W section and sends it to the R/W signal generating section. In response to the sync signal, the WG signal generating section generates a first WG signal for the first FDD and a second WG signal for the second FDD and selectively outputs one of the first and second WG signals to the first and second FDDs in accordance with the mode signal received from the mode signal supplying section. In accordance with the received WG signal and the first and second selection signals, the first and second FDDs record data corresponding to an incoming write data (WD) signal on a disk, read out the recorded data from the disk and generate first and second RD signals corresponding to the read recorded data as the RD signal.

27 Claims, 6 Drawing Sheets

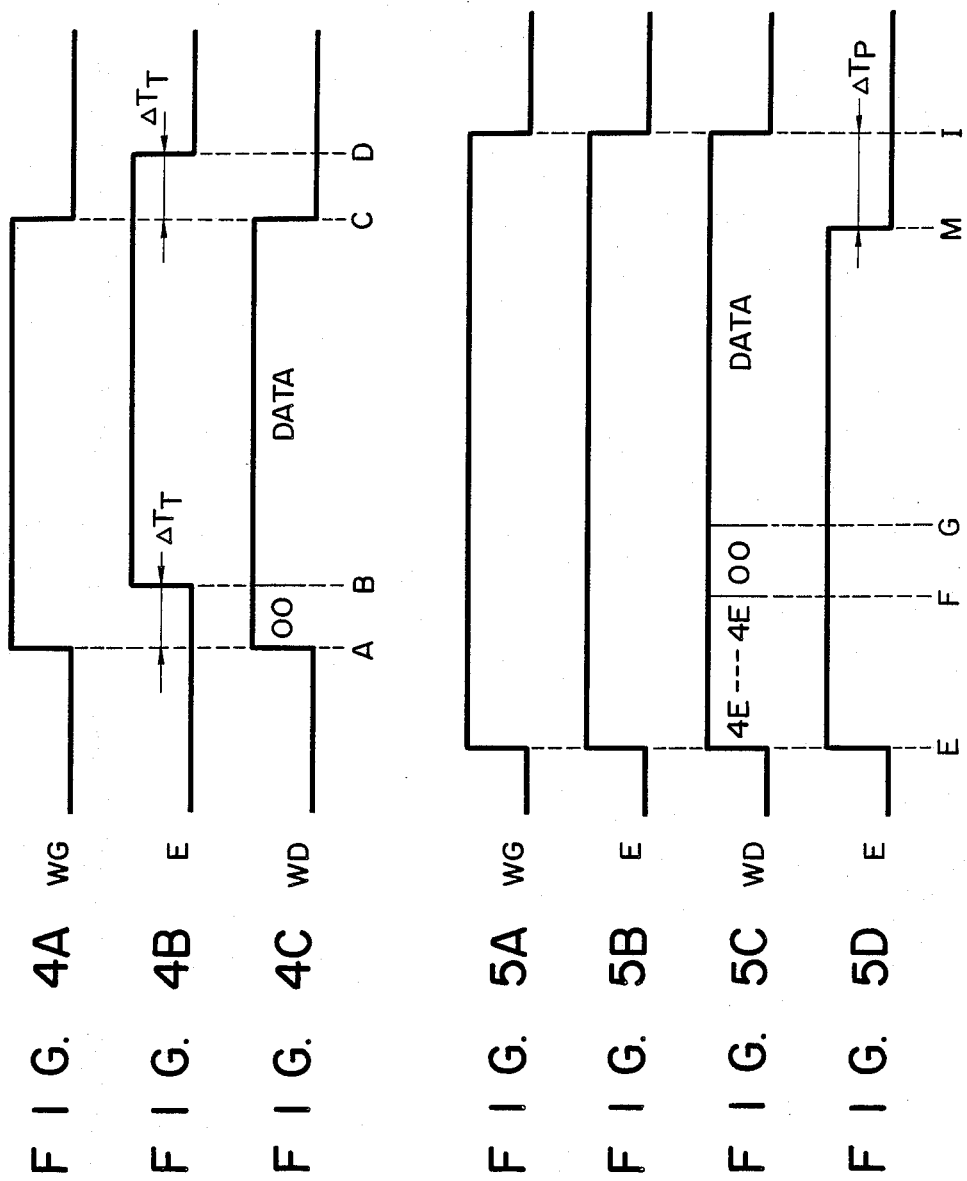

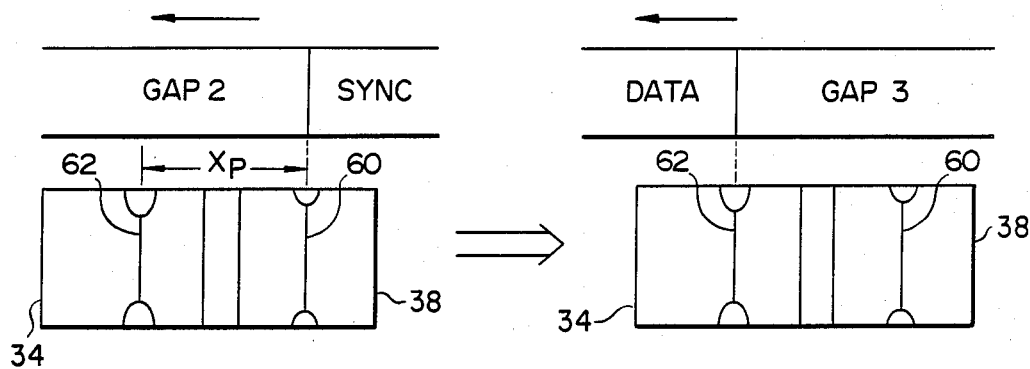
F I G. 6A   F I G. 6B
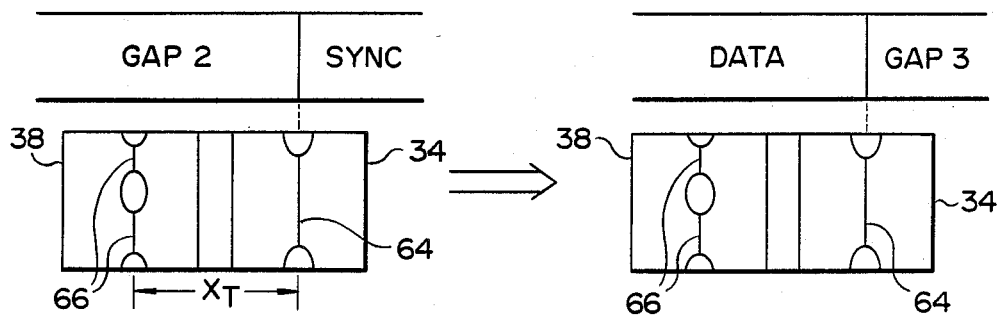
F I G. 7A   F I G. 7B

METHOD OF SHARING VARIOUS TYPES OF MEDIUM DRIVES AND RECORDING/REPRODUCTION APPARATUS WITH MEDIUM CONTROLLER FOR REALIZING THE METHOD

BACKGROUND OF THE INVENTION

1. Field of the Invention

The present invention relates to a method of sharing various types of medium drives and a recording/reproduction apparatus including a medium controller for practicing the method.

2. Description of the Related Art

In a magnetic recording/reproduction apparatus including a floppy disk drive (FDD), the same recording medium must be able to be used in different floppy disk drives, and accurate data-access must be achieved.

A plurality of concentric tracks for recording data are formed on a recording medium. FIG. 1 illustrates the format of each track. Each sector has an identification (ID) field and a data field. For example, in an MFM recording, the ID field is separated from the data field by GAP2 field in which 22 bytes of data $(4E)_H$ are written. The ID field includes a SYNC subfield in which data $(00)_H$ is written and an ID subfield in which an identification code is written. The data field includes a SYNC subfield in which data $(00)_H$ is written and a data subfield in which recording data is written. The adjacent sectors are separated from each other by GAP3 field. Assume that data are recorded on each track of the medium, fully across the track. If the recording medium is set slightly eccentrically to the drive, or the recording medium is warping, the head of the drive would be a little off the track. In this case, a portion of the head is located above the adjacent track, and the head will inevitably read the recorded data from not only the target track but also the adjacent track.

In order to avoid the disk drive reading the recorded data from the tracks adjacent to the target track, a gap is provided between tracks to make the track width narrower than the track pitch. To provide the gap, the conventional floppy disk drive is provided with a tunnel erase head or a straddle head. The head records data on each track, and, at the same time, erases the recorded data from either side of the target track by a predetermined width.

The typical straddle head comprises a read/write (R/W) core having a R/W gap and erase cores each located on either side of the R/W gap, having an erase gap being provided between the R/W core and erase core. At the same time a data signal is supplied to a R/W coil wound around the R/W core for data writing, an erase signal is supplied to an erase coil wound around each erase core thereby erasing the data signals recorded on both side portions of the target track by a predetermined width. However, since the R/W gap and erase gap are located very close to each other, the output of the straddle head has a low S/N ratio. Because of the low S/N ratio, the straddle head is not usually used in a floppy disk drive. Rather, the tunnel erase head type drive is typically used in the conventional floppy disk drive.

As shown in FIG. 2, a tunnel erase head comprises R/W head 106 having a R/W core having a R/W gap 116 and a coil wound around the core, and an erase head 108 disposed behind R/W head 106. Erase head 108 has two erase gaps 118 aligned with the ends of R/W gap 116. A data signal is supplied to the R/W coil wound around the R/W core, while an erase signal is supplied to the erase coil wound around the erase core. Therefore, following the recording of data signals on the recording medium, the data signals recorded on both side portions of the target track are erased.

According to the tunnel erase head type FDD, erase gaps 118 are located behind R/W gap 116 by distance $X_T$. Hence, in order to accurately erase the data signals recorded on both sides of the target track from the position where the signal recording on the track has started to the position where the signal recording is ended, the supply of the erase signal to the erase coil must be delayed by time $\Delta T_{TON}$ from the start of the data recording. Stopping the supply of the erase signal must be delayed by time $\Delta T_{TOFF}$ from the end of the recording thereof.

The following relationship is given $$\Delta T_{TON} = \Delta T_{TOFF} = X_t/V_T = \Delta T_T$$

where $V_T$ is the linear velocity at which the recording medium moves relative to the tunnel erase head.

In recording data on a recording medium, a host computer supplies the floppy disk controller (FDC) with a timing signal representing the record-starting time and the record-ending time. The timing signal is supplied to a control circuit provided within the FDC. The control circuit outputs write gate signal WG and erase gate signal EG to the FDD. In the FDD, signal WG will be used to supply a write data signal WD to the R/W coil. Signal EG is delayed by time $\Delta T_T$ from the signal WG. In this case, the recording medium is rotated at a constant speed, and hence, linear velocity $V_T$ of the recording medium relating to the magnetic head varies depending on the tracks. Therefore, it is desired that time $\Delta T_T$ be changed whenever the head moves from one track to another.

Generally, however, time $\Delta T_{TON}$ is determined such that the tunnel erase head can entirely erase the data recorded on the track on both sides from a start position where recording of the data is started even when the head is positioned at the outermost track where linear velocity $V_T$ is the maximum. The time $\Delta T_{TOFF}$ is determined such that the tunnel erase head can assuredly erase the data recorded on the track on both sides to a end position where recording of the data is ended even when the head is positioned at the innermost track of the recording medium where the linear velocity $V_T$ is the minimum. More specifically, these times are set as follows:

$$\Delta T_{TON} \leq X_T/V_{in}$$

$$\Delta T_{TOFF} \leq X_T/V_{out}$$

where Vout is the relative linear velocity of the head positioned at the outermost track and Vin is the relative linear velocity of the head positioned at the innermost track. In this case, the closer to the innermost track the head position is, the more over-erased areas exist on both sides at the beginning portion. On the other hand, the closer to the outermost track the head position is, the more over-erased areas exist on both sides at the end portion. Each track is divided into sectors each including so-called "gap regions" preceding and following the data filed as shown in FIG. 1. Gap regions are provided for protecting the data against a fluctuation of the data field, which may happen due to a dimensional error of the floppy disk drive or change in rotational speed of the recording medium. Hexadecimal data FF in FM recording or data 4E in MFM recording is written in these gap field. Since the over-erased areas produced preceding and following the data field fall within these gap fields, there will be no problems.

It is demanded that a floppy disk drive should record data on a recording medium in a high density. As is disclosed in, for example, Toshiba Review, No. 154, Winter 1985, 18-22 pp, a perpendicular recording floppy disk has been developed, which comprises a barium ferrite layer, as a magnetic material, coated on a base film, and has a 4MB recording capacity. The more data that is recorded on a track, or the higher the recording density is, the shorter wavelength the data signals must have. To accurately read signals of short wavelengths, the width of the read gap must be narrower. In most floppy disk drives, the read gap is used also as the write gap so that the write gap inevitably becomes narrower. The narrower the write gap, the smaller the magnetization region defined by the magnetic flux generated in the gap. The depth of the magnetization region being magnetized is said to be about the same as the length of the write gap. Therefore, in order to erase signals completely from a track by overwriting new data on the same track, it is required that the thickness of the magnetic layer be about a quarter of the wavelength of a data signal. This is explained in "The Reproduction Of Magnetically Recorded Signals" written by Wallace, Jr, Bell System Technology Journal, Vol. 30, No. 4, 1951. For instance, with a recording density of 35 KBPI, the read/write gap length must be set at about 0.5 um in consideration of gap loss, and thus the magnetic layer must have a thickness of about 0.5 um or less.

It is difficult, however, to uniformly coat the magnetic material on the base film of the recording medium. Consequently, signal recording is effected only on the surface portion of the magnetic layer, and even after new data have been overwritten on the previously recorded data, the previously written data are left unerased. This undesired phenomenon also takes place when the magnetic layer is made of a magnetic material having a high coercive force.

In order to prevent this phenomenon, a preerase head has been developed. As is illustrated in FIG. 2, the preerase head comprises a R/W Read 104 having a R/W gap 114 and a preerase head 102 provided upstream of the R/W head 104 with respect to the direction of movement of a recording medium. Preerase head 102 has an erase gap 112, which faces read/write gap 114 and is longer and wider than R/W gap 114. According to the preerase type FDD, data signals are recorded on the target track in the following manner. First, an erase signal is supplied to an erase coil wound around an erase core, and the track area is widely erased to the deep area of the magnetic layer of the recording medium by erase gap 112 reaching the recording position on the recording medium, preceding R/W gap 114. As a result, new data are recorded in the data field, from which the previously-recorded data have been completely erased, by R/W gap 114 which reaches this data field following the erase gap 112. Even with a disk having a high recording density in use, therefore, the overwrite characteristic is not deteriorated.

An example of a magnetic recording/reproduction apparatus utilizing the wide preerase type FDD is disclosed in commonly assigned U.S. Pat. Application Ser. No. 067,972 filed on Jun. 30, 1987. In this example, a write gate signal (WG), an erase gate signal (EG) and a write data signal (WD) are sent to the preerase head type FDD from a FDC. According to the aforementioned tunnel erase type FDD, by comparison, only the write gate signal and write data signal are sent to the FDD from the FDC; an erase signal corresponding to the erase gate signal is produced in this FDD in accordance with the received write gate signal.

The phase relationship between the write gate signal and the erase gate signal in the preerase type FDD is opposite to the phase relationship involved in the tunnel erase type FDD. Naturally, the erase gate signal cannot be produced from the write gate signal in the preerase type FDD.

If data recording in the wide preerase type FDD is done using the same write gate signal as used in the tunnel erase type, the following problem would occur. There would be an unerased area produced in the SYNC subfield of the data field, which continues for time $\Delta Tp(=Xp/Vp)$, where Vp is the relative speed of the head with respect to the disk and Xp is the distance between R/W gap 114 and erase gap 112. In addition, the gap field GAP3 in FIG. 1 will have an unerased area. Particularly, since the content of the SYNC subfield is used as a sync signal in data reproduction, if the SYNC subfield has a deteriorated overwrite characteristic due to having the unerased area, the S/N ratio of a reproduction signal from the unerased area during reproduction as well as the tracking characteristic of a PLL circuit on the basis of the reproduction signal from the magnetic head are deteriorated.

Because of the above problems, a FDC for the tunnel erase type FDD could not be used for the preerase type FDD. In this respect, therefore, it was necessary to provide two separate FDCs to commonly use the tunnel erase type FDD and the preerase type FDD.

SUMMARY OF THE INVENTION

It is therefore an object of this invention to provide a magnetic recording/reproduction apparatus which can use various types of floppy disk drives. The apparatus comprises:

a first floppy disk drive (FDD) of a preerase head type including a first read/write section responsive to an incoming write gate (WG) signal and an incoming first selection signal for selectively recording on a disk first recorded data corresponding to a write data (WD) signal input thereto, for selectively reading the first recorded data from the disk to generate a first read data (RD) signal corresponding to the first recorded data as an RD signal; and a second FDD of a tunnel erase head type including a second read/write section responsive to the write gate (WG) signal input thereto and a second selection signal input thereto for selectively recording on a disk second recorded data corresponding to an incoming WD signal, and for selectively reading the second recorded data from the disk to generate a second RD signal corresponding to the read recorded data as an RD signal.

A write gate signal generating section selectively generates a first WG signal for the first FDD and a second WG signal for the second FDD in response to a sync signal input thereto to selectively output one of the first and second WG signals to the first and second FDDs as the WG signal in accordance with a mode signal input thereto.

A selection signal generating section selectively outputs the first and second selection signals to the first and second FDDs, respectively, in response to a selection signal generated in accordance with a write command.

A sync signal generating section generates a sync signal from the RD signal from one of the first and second FDDs, and a mode signal supplying section generates a mode signal in accordance with the write command and outputs it to the write gate signal generating section.

As described above, according to this invention, it is possible to produce a write gate signal with the proper timing for each of a mode for using a tunnel erase type magnetic head and a mode for using a wide preerase type magnetic head. In recording data on a high recording density disk using the wide preerase type magnetic head, therefore, it is possible to prevent the overwrite characteristic, particularly, of a sync field of the disk from being deteriorated. This can ensure that the wide preerase type magnetic head performs an assured recording operation on the high recording density disk.

Consequently, a single FDC can be shared by the tunnel erase type FDD and the wide preerase type FDD to assuredly initiate in the data read/write operation.

BRIEF DESCRIPTION OF THE DRAWINGS

FIGS. 4A to 4C are timing charts for using a tunnel erase head type FDD;

FIGS. 5A to 5C are timing charts for using a preerase head type FDD;

FIG. 5D (is a timing chart illustrating an erase signal used in a magnetic recording/reproduction apparatus according to a second embodiment of this invention;

FIGS. 6A and 6B and FIGS. 7A and 7B are diagrams for explaining the operation of the magnetic recording reproduction apparatuses according to the first and second embodiments;

DETAILED DESCRIPTION OF THE PREFERRED EMBODIMENTS

Preferred embodiments of a recording/reproduction apparatus of this invention will now be explained in detail in conjunction with the accompanying drawings.

Figure 3:
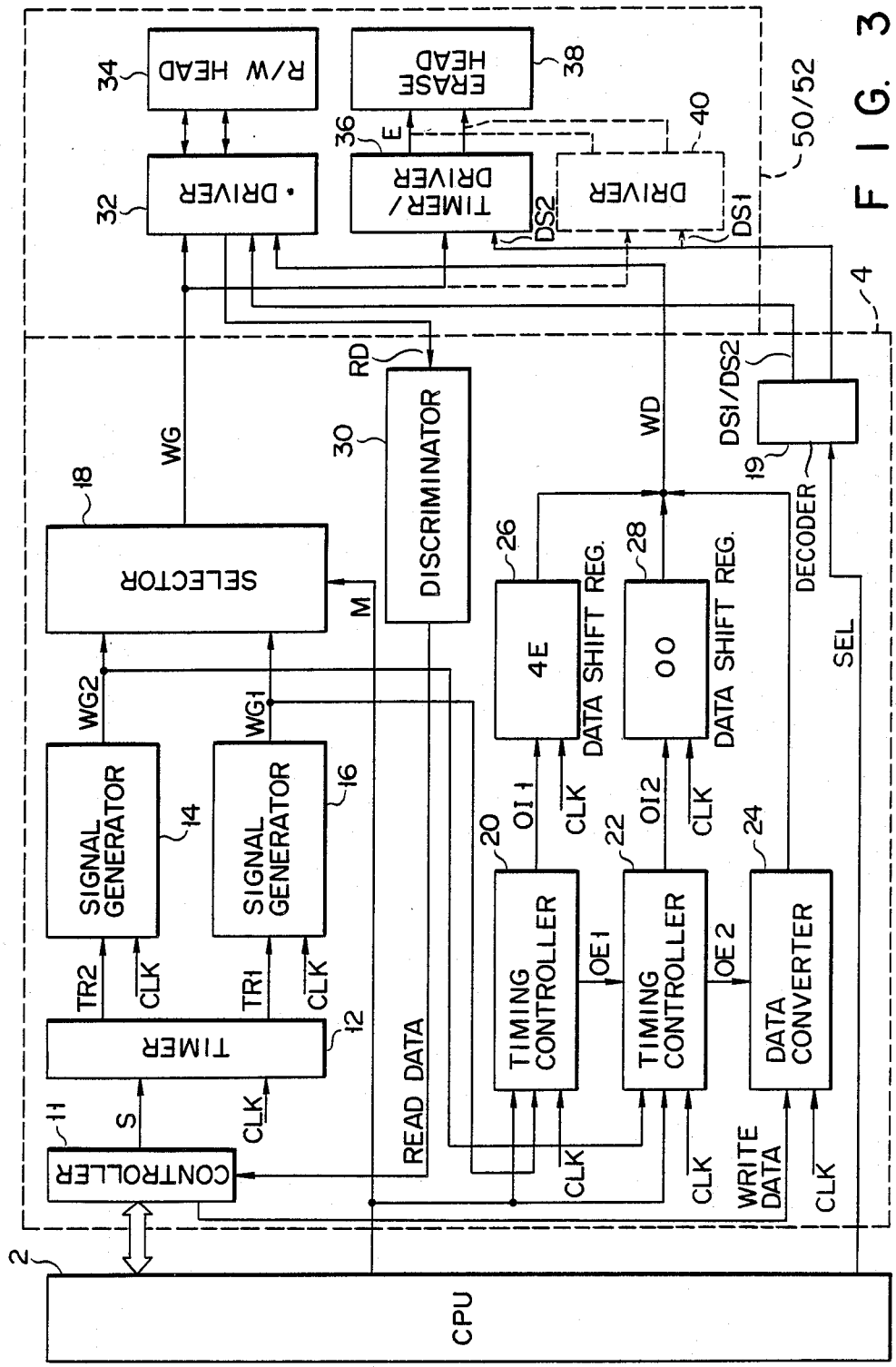
FIG. 3 is a block diagram illustrating the structure of a magnetic recording/reproduction apparatus according to a first embodiment of this invention.
Figure 8:
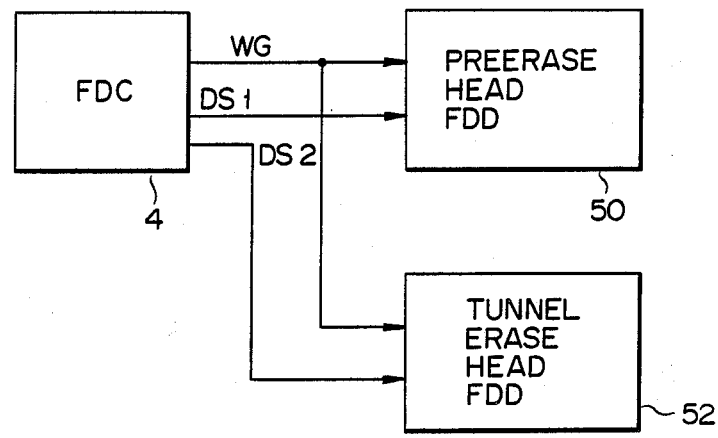
FIG. 8 is a diagram illustrating an arrangement for sharing a single FDC for the preerase head type FDD and the tunnel erase head type FDD.
Figure 10:
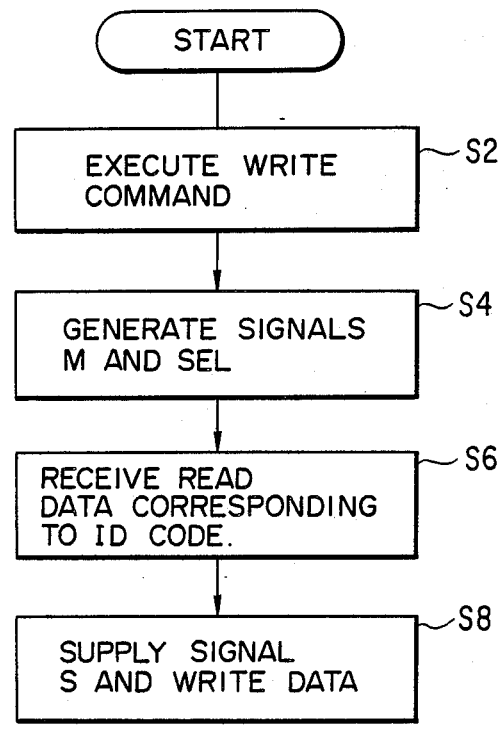
FIG. 10 is a flowchart for explaining the operation of the first embodiment.

Referring to FIGS. 3 and 8, the structure of the first embodiment of the recording/reproduction apparatus of the present invention will be explained. The recording/reproduction apparatus, for example, a magnetic recording/reproduction apparatus, comprises CPU 2, floppy disk controller (FDC) 4, and floppy disk drive 50 or 52. CPU 2 controls the operation of FDC 4 and outputs a mode signal M, a drive select signal SEL, and write data to FDC 4 in accordance with a write command to be executed.

Figure 1:
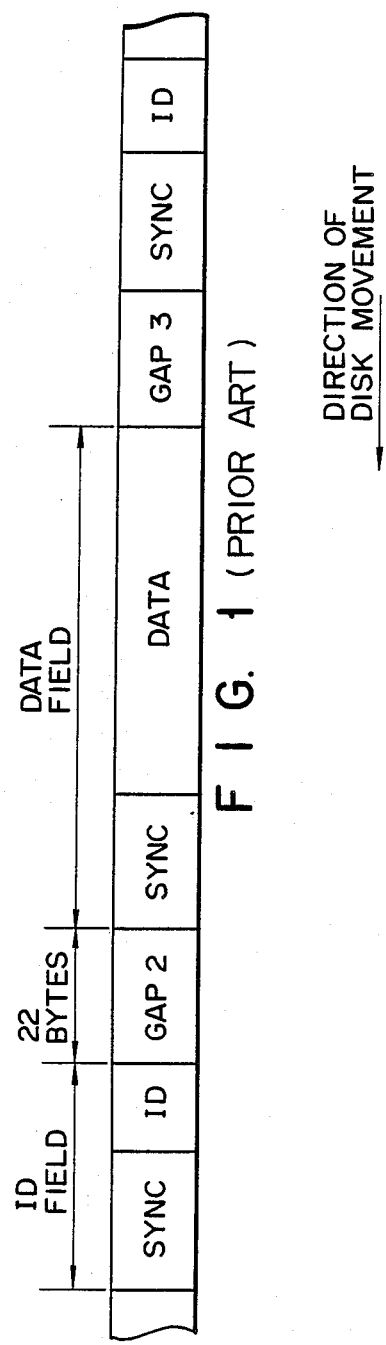
FIG. 1 is a diagram illustrating the data recording format on a track.
Figure 2:
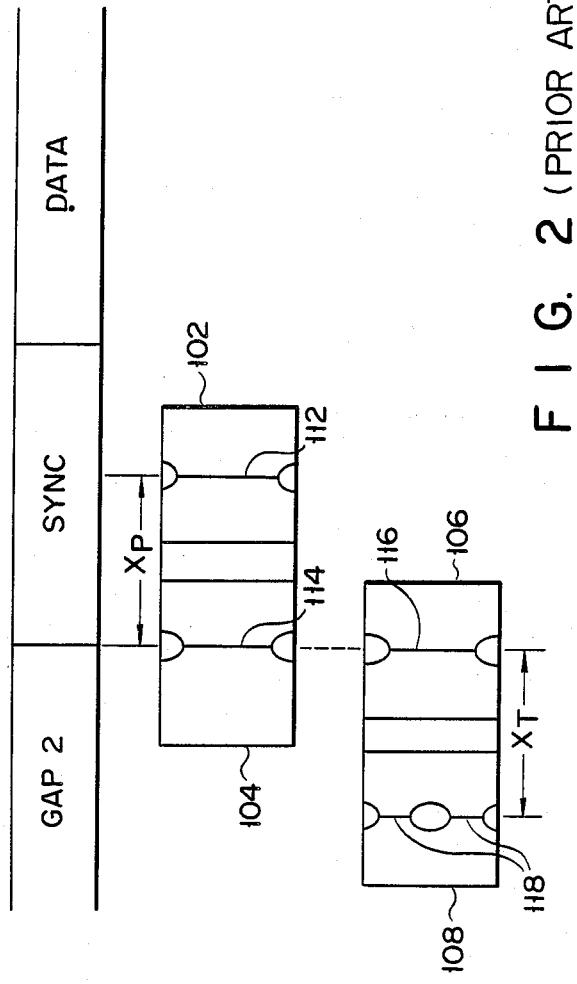
FIG. 2 is a diagram illustrating the positional relationship between the recording format and a preerase head and a tunnel erase head.

FDC 4 has controller 11 which detects the ID code in the ID subfield shown in FIG. 1 from input read data and generates signal S in accordance with a detecting result. Controller 11 also outputs the read data to CPU 2 and inputs write data from CPU 2. Timer 12 generates trigger pulses TR1 and TR2 in accordance with signal S from controller 11 and clock CLK. Pulse TR2 is generated when a floppy disk rotates by an amount corresponding to 22 bytes after signal S is input from controller 11, while pulse TR1 is generated when the disk rotates by an amount corresponding to 3 bytes. Signal generators 14 and 16 respectively generate write gate signals WG2 and WG1 in accordance with trigger pulses TR2 and TR1 from timer 12 and send the write gate signals to selector 18. Selector 18 selectively outputs one of received signals WG1 and WG2 as a write gate signal WG to FDD 50/52 in accordance with signal M from CPU 2.

Timing controller 20 generates data output instruction signal OI1 in accordance with signal WG1, signal M, and clock CLK. Controller 20 is preset with a time value corresponding to 19 bytes for ½ M bytes mode and 38 bytes for 4 M bytes mode, and the time value is decremented each time signal OI1 is generated. When signal WG1 is selected by selector 18 in accordance with signal M, controller 20 generates signal OI1 in response to clock CLK if the decremented time value is not "0". Data shift register 26 is preset in advance with data "4E"$_H$ and outputs the data "4E"$_H$ bit by bit as write data signal WD to FDD 50/52 in accordance with signal OI1 from controller 20. After outputting signal OI1 to shift register 26 so that the register 26 outputs 19 bytes of write data in succession, controller 20 outputs an output enable signal OE1 to timing controller 22 and is then reset.

Timing controller 22 generates data output instruction signal OI2 in accordance with signal M, signal WG2, clock CLK, and output enable signal OE1. When selector 18 selects signal WG2 in response to signal M, controller 22 is controlled by the signal WG2. When selector 18 selects signal WG1 in response to signal M, on the other hand, controller 22 is controlled by signal OE1. This controller 22 is preset with a time value corresponding to 12 bytes, generates signal OI2 upon reception of each clock CLK, and the time value is decremented in response to each clock CLK. Data shift register 28 is preset in advance with data "00"$_H$, and sends the data "00"$_H$ bit by bit as write data signal WD to FDD 50/52 in accordance with signal OI2 from controller 22. After outputting signal OI2 to cause shift register 28 to output write data for 12 bytes, controller 22 sends output enable signal OE2 to data converter 24 and is then reset. Data converter 24 outputs the write data from CPU 2 bit by bit, as signal WD, to FDD 50/52 in accordance with clock CLK and output enable signal OE2 output from controller 22.

Decoder 19 decodes signal SEL from CPU 2 and generates signal DS1 or DS2 to designate either FDD 50 or 52 to be accessed. Discriminator 30 produces read data from read data signal RD output from FDD 50 or 52 and sends read data to controller 11.

FIG. 3 illustrates two FDDs, namely, preerase head type FDD 50 and tunnel erase head type FDD 52 for diagrammatical simplicity. The tunnel erase head type FDD 52 comprises driver 32, read/write (R/W) head 34, timer/driver 36 and erase head 38, while the preerase head type FDD 50 comprises driver 32, R/W head 34, driver 40 and erase head 38.

In preerase head type FDD 50, driver 32 outputs signal WD to head 34 in accordance with signal WG upon reception of signal DS1 to cause the head to write data on the disk. At this time, timer/driver 36 is also supplied with signal DS2 and signal WG, and generates erase signal E having a phase delay of $\Delta T_T$ from signal WG and outputs it to head 38.

The operation of the above embodiment will now be explained referring to FIGS. 4A to 7B, and FIG. 10.

FDDs currently coupled to CPU 2 are registered in CPU 2. With reference to one of such FDDs at a time, the execution of a write command by CPU 2 for write access will now be explained.

Access to preerase head type FDD will be explained next. When CPU 2 executes a write command in step S2 of FIG. 10, mode signal M in supplied to selector 18 and controller 22 and signal SEL is supplied to decoder 19 in step S4. Decoder 19 generates signal DS1 and sends it to FDD 50, thereby rendering FDD 50 accessible. Then, head 34 reads out an ID code from the ID subfield as shown in FIG. 1 and sends the readout ID code to controller 11 through discriminator 30 in step S6. When controller 11 acknowledges the reading of the ID code from the ID subfield, it outputs signal S to timer 12 in step S8.

In response to signal S, timer 12 counts clock CLK and sends trigger pulse TR1 to signal generator 16 after counting the clocks for 3 bytes. In response to pulse TR1, generator 16 generates write gate signal WG1 and sends it to selector 18 and controller 20. Selector 18 selects signal WG1 in accordance with signal M and sends it to FDD 50 as signal WG at timing E as shown in FIG. 5A. At this time, gap 60 of erase head 38 is positioned at the beginning of the SYNC subfield of the data field as shown in FIG. 6A, while gap 62 of R/W head 34 is positioned downstream of the beginning of the SYNC subfield. In FDD 50, driver 40 generates erase signal E in accordance with signal WG at the same timing as the signal WG, as shown in FIG. 5B, so that already-recorded data is erased from the SYNC subfield. At the same time, upon reception of signal WG1, controller 20 sends signal OI1 to register 26 in response to clock CLK. Register 26 sequentially outputs bit data corresponding to "4E"$_H$ as signal WD to FDD 50 at the timing E as shown in FIG. 5C, in response to signal OI1. As a result, write data is written on the disk through driver 32 and head 34. That is, since gap 62 of R/W head 34 lies on the GAP2 field at the time when signal WG becomes active, 19 byte data "4E"$_H$ will be written on the GAP 2 field.

When the beginning of the SYNC subfield reaches gap 62 of R/W head 34, i.e., at the timing F when the writing of 19 bytes of data "4E"$_H$ is completed, controller 20 sends signal OE1 to controller 22. At this time, timer 12 outputs trigger pulse TR2 to generator 14 when counting the clocks for 22 bytes. In response to pulse TR2, generator 14 generates write gate signal WG2 and sends it to selector 18. However, selector 18 does not select signal WG2.

When signal WG1 is selected in accordance with signal M, controller 22 outputs signal OI2 to register 28 upon reception of clock CLK in response to signal OE1. Register 28 sequentially outputs bit data corresponding to data "00"$_H$ for 12 bytes as signal WD to FDD 50 in response to signal OI2, as shown in FIG. 5C. Consequently, write data is written on the disk as bit data of the SYNC subfield through driver 32 and head 34.

When gap 62 of R/W head 34 reaches the data subfield, i.e., at the timing G when the writing of 12 bytes of data "00"$_H$ is completed as shown in FIG. 5C, controller 22 sends signal OE2 to converter 24. Upon reception of this signal OE2, converter 24 outputs the write data from CPU 2 via controller 11 as bit data signal WD to FDD 50 in response to clock CLK. Consequently, the write data is written on the disk as data of the data subfield through driver 32 and R/W head 34.

When the write data is thereafter written and gap 62 of R/W head 34 reaches GAP3 at the timing I, signal WG becomes inactive. This also renders signal E inactive, thus completing the erase operation. Since gap 60 of erase head 38 is in GAP3 field at this time, however, an area simply erased remains in GAP3. This completes the write operation for one sector with respect to preerase head type FDD 50.

The access operation to tunnel erase head type FDD 52 will now be explained. When CPU 2 executes a write command in step S2 of FIG. 10, mode signal M is supplied to selector 18 and controller 22 and signal SEL is supplied to decoder 19 in step S4. Decoder 19 generates signal DS2 and sends it to FDD 52, thereby rendering the FDD 52 accessible. Then, head 34 reads the ID code from the ID subfield as shown in FIG. 1 and sends the data to controller 11 through discriminator 30. When controller 11 acknowledges the ID code from the ID subfield, it outputs signal S to timer 12.

In response to signal S, timer 12 counts clock CLK and sends trigger pulse TR1 to signal generator 16 after counting the clocks for 3 bytes. In response to pulse TR1, generator 16 generates write gate signal WG1 and sends it to selector 18 and controller 20. However, selector 18 does not select signal WG1 in accordance with signal M, nor does controller 20 generate signal OI1 in accordance with signal M even upon reception of signal WG1.

After counting the clocks for 22 bytes, timer 12 sends trigger pulse TR2 to generator 14. In response to pulse TR2, generator 14 generates write gate signal WG2 and sends it to selector 18. Selector 18 selects signal WG2 in accordance with signal M and sends it to FDD 52 as signal WG at timing A as shown in FIG. 4A. At this time, gap 64 of R/W head 34 is positioned at the beginning of the SYNC subfield of the data field as shown in FIG. 7A, while gaps 66 of erase head 38 are positioned in the GAP2 field. In FDD 52, timer/driver 36 generates erase signal E in accordance with signal WG with a time delay of $\Delta T_T$ from signal WG as shown in FIG. 4B, so that currently-recorded data is erased at both sides from the SYNC subfield of the disk.

As signal WG2 is selected by selector 18 in accordance with signal M, controller 22 outputs signal OI2 to register 28 in response to signal WG2 each time clock CLK is received. Register 28 sequentially outputs bit data corresponding to data "00"$_H$ for 12 bytes as signal WD to FDD 52 in response to signal OI2 at timing A, as shown in FIG. 4C. Consequently, write data is written on the disk through driver 32 and head 34. That is, gap 64 of R/W head 34 starts writing data in the sync field at timing A when signal WG becomes active.

When gap 64 of head 34 reaches the data subfield, i.e., at the timing B where the writing of 12 bytes of data "00"$_H$ is completed as shown in FIG. 4C, controller 22 sends signal OE2 to converter 24. Upon reception of this signal OE2, converter 24 outputs the write data from CPU 2 via controller 11 as bit data signal WD to FDD 52 in response to clock CLK. Consequently, the write data is written on the disk as data of the data subfield through driver 32 and head 34.

When the write data is thereafter written and gap 64 of head 34 reaches GAP3 field at the timing C, signal WG becomes inactive, thus completing the writing operation of the write data.

When the beginning of the SYNC subfield reaches erase gaps 66, erasing of both side portions of the data field starts by signal E. When signal WG becomes inactive, signal E also becomes inactive with a time delay of $\Delta T_T$, thus completing the erase operation. At this time, gaps 66 of head 38 are at the beginning of GAP3 field, which means that the erasing operation for the data field is completely executed. This completes the write operation for one sector with respect to tunnel erase head type FDD 52.

In the first embodiment, signals M and SEL are directly output from CPU 2 to selector 18 and decoder 19, respectively. However, these signals may be output via controller 11.

Figure 9:
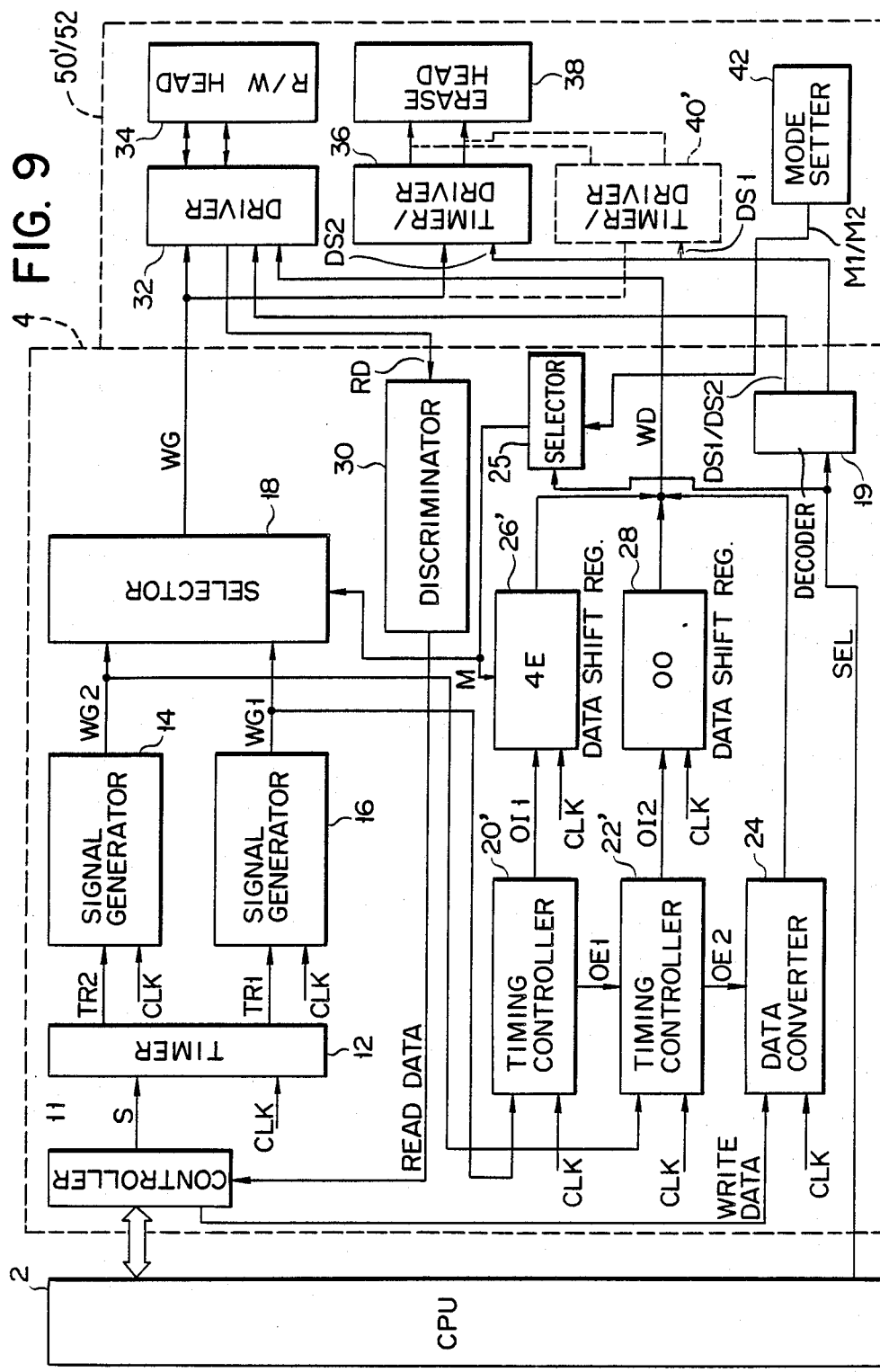
FIG. 9 is a block diagram illustrating the structure of the magnetic recording/reproduction apparatus according to the second embodiment.

Referring now to FIG. 9, the structure of the second embodiment will be explained. As the second embodiment slightly differs from the first embodiment, only the differences will be explained below. Unlike the first embodiment, when executing a write command, CPU 2 does not output signal M, but outputs drive select signal SEL and write data to FDC 4.

In FDC 4, timer 12 receives signal S from controller 11 via discriminator 30 and selector 18 receives one of mode signals M1 or M2 from mode setter 42 of FDDs 50' or 52 as signal M.

Timing controller 20' does not receive signal M and generates data output instruction signal OI1 in accordance with signal WG1 and clock CLK. Data shift register 26' is supplied with signal M from mode setter 42, which signal is used to determine whether or not shift register 26' should output data "4E" bit by bit as write data signal WD in accordance with signal OI1.

Timing controller 22' also does not receive signal M, and therefore generates signal OI2 in accordance with signal OE1 sent from controller 20'. Discriminator 30 produces read data from a read data signal read by head 34 and sends the data to controller 11. When controller 11 detects the end of data of the ID subfield, it outputs signal S to timer 12.

In FDD 50', timer/driver 40' is used for driver 40. Driver 40' generates signal E as shown in FIG. 5D in accordance with signal WG; signal E becomes inactive $\Delta T_T$ earlier than signal WG. Each FDD 50' or 52 has mode setter 42, which is set in advance depending on the type of a FDD to be used and outputs signals M1 and M2 to FDC 4 in accordance with signals DS1 and DS2.

The following will explain the operation of the second embodiment. Since the basic operation is the same as that of the first embodiment, only the differences will be explained.

To begin with, the explanation is given with regard to preerase head type FDD 50'. When CPU 2 executes a write command, signal SEL is output to decoder 19 and selector 25. As a result, signal M1 from FDD 50' is selected by selector 25 and sent as signal M to selector 18 and register 26'. Then, head 34 reads data from the ID field as shown in FIG. 1, and controller 11 outputs signal S to timer 12 when it discriminates that the data is the ID code.

Upon reception of signal OI1 generated from controller 20' in accordance with signal WG1, register 26' outputs bit data of "4E"$_H$ as signal WD in response to clock CLK because FDD 50' is selected. The subsequent operation is the same as is done in the first embodiment. Although signal E becomes active in accordance with signal WD at the same time as the signal WG, the signal E is rendered inactive by a timer provided in timer/driver 40' prior to time $\Delta$ Tp at which signal WG becomes inactive. Accordingly, it is the entire data field which is to be erased by erase gap 60, leaving the GAP3 field unerased. This completes the write operation for one sector with respect to preerase head type FDD 50'.

The accessing to tunnel erase head type FDD 52 will now be explained. When CPU 2 executes a write command, signal M2 from FDD 52 is selected by selector 25 as signal M in accordance with signal SEL and is output to selector 18 and register 26'. Then, head 34 reads data from the ID field and sends it through discriminator 30 to controller 11. When controller 11 acknowledges that the data is the ID code written in the ID subfield, it sends signal S to timer 12.

When timer 12 counts the clocks for 3 bytes, controller 20' generates signal OI1 in response to signal WG1 from generator 16. Since signal WG2 has been selected by selector 18 in accordance with signal M, however, register 26' does not output data "4E" as signal WD. When R/W gap 64 reaches the SYNC subfield, controller 20' sends signal OE1 to controller 22'. Controller 22' generates signal OI2 in accordance with signal WG2 and sends it to register 28. The subsequent operation is the same as is done in the first embodiment. In this manner, the write operation for one sector with respect to tunnel erase head type FDD 52 is completed.

What is claimed is:

1. A disk controller in a recording/reproduction apparatus adapted to be able to control various head types of medium drives, each of which performs a write operation in accordance with a write gate (WG) signal, comprising:

sync signal generating means for generating a sync signal from a read data (RD) signal input thereto;

write gate signal generating means responsive to said sync signal from said sync signal generating means, for selectively generating a first WG signal for a first medium drive (MD) and a second WG signal for a second MD of a different type from said first MD, and for selectively outputting one of said first and second WG signals as said WG signal for one of said first and second MDs in accordance with a mode signal input thereto; and write data signal generating means responsive to said first and second WG signals from said write gate signal generating means and said mode signal input thereto, for selectively generating a first WD signal to output said generated first WD signal as a WD signal for said first MD, for selectively generating a second WD signal to output said generated second WD signal as said WD signal for one of said first and second MDs, and for generating a third WD signal from write data input thereto to output said generated third WD signal as said WD signal for one of said first and second MDs, said second WD signal being generated following generation of said first WD signal when said first WD signal is generated, and said third WD signal being generated following generation of said second WD signal.

2. The apparatus according to claim 1, wherein said write gate signal generating means comprises:
   timer means for generating first and second trigger signals in response to said sync signal;
   first WG signal generating means for generating said first WG signal in accordance with said first trigger signal from said timer means;
   second WG signal generating means for generating said second WG signal in accordance with said second trigger signal from said timer means; and
   selection means for selectively outputting one of said first WG signal from said first WG signal generating means and said second WG signal from said second WG signal generating means as said WG signal for one of said first and second MDs in accordance with said mode signal.

3. The apparatus according to claim 1, wherein said write data signal generating means comprises:
   first register means for holding first data, and for selectively generating said first WD signal corresponding said first data in response to a first output instruction input thereto to output said generated first WD signal as said WD signal for said first MD;
   second register means for holding second write data, and for selectively generating said second WD signal corresponding to said second write data in response to a second output instruction input thereto to output said generated second WD signal as said WD signal for one of said first and second MDs;
   first control means for selectively generating said first output instruction in response to said first WG signal and said mode signal to output said generated first output instruction to said first register means, and for generating a first output enable signal upon completion of said first WD signal;
   second control means for selectively generating said second output instruction in response to said second WG signal, said mode signal, and said first output enable signal from said first control means to output said generated second output instruction to said second register means, and for generating a second output enable signal upon completion of said second WD signal; and
   data converter means for generating said third WD signal from said write data input thereto in response to said second output enable signal from said second control means to output said generated third WD signal as said WD signal for one of said first and second MDs.

4. The apparatus according to claim 1, wherein said write data signal generating means comprises:
   first register means responsive to a first output instruction input thereto and said mode signal, for holding first data, and for selectively generating said first WD signal corresponding to said first data to output said generated first WD signal as said WD signal for said first MD;
   second register means responsive to a second output instruction input thereto, for holding second data, for generating said second WD signal corresponding to said second write data to output said generated second WD signal as said WD signal for one of said first and second MDs;
   first control means for selectively generating said first output instruction in response to said first WG signal to output said generated first output instruction to said first register means, and for generating a first output enable signal upon completion of said first WD signal;
   second control means for selectively generating said second output instruction in response to said second WG signal and said first output enable signal from said first control means to output said generated second output instruction to said second register means, and for generating a second output enable signal upon completion of said second WD signal; and
   data converter means for generating said third WD signal from sad write data input thereto in response to said second output enable signal from said second control means to output said generated third WD signal as said WD signal for one of said first and second MDs.

5. The apparatus according to claim 1, further comprising mode signal supplying means for generating and outputting said mode signal to said write gate signal generating means.

6. The apparatus according to claim 5, wherein said mode signal supplying means includes means for generating and outputting said mode signal to said write gate signal generating means in accordance with a write command for one of said first and second MDs.

7. The apparatus according to claim 5, wherein said mode signal supplying means includes means for generating said mode signal in accordance with a preset mode.

8. The apparatus according to claim 1, wherein each of said first and second MDs includes a read/write head having a read/write gap and drives a magnetic disk;
   wherein said sync signal generating means includes means for generating said sync signal when an identification (ID) code of an ID field in a sector of said magnetic disk to be accessed in accordance with a write command is detected, said sector comprising said ID field, a gap field and a data field, said data field including a sync subfield and a data subfield; and
   wherein said write gate signal generating means includes means responsive to said sync signal, for generating said second WG signal for a first period where said read/write gap is in said data field, and for generating said first WG signal for a second period where said read/write gap is in a field from a position preceding by a first distance to said data field to an end of said data field.

9. The apparatus according to claim 8, wherein said write data signal generating means includes means for generating said first WD signal corresponding to gap data written in said gap field from said position preceding by said first distance to said data field to a start of said data field, said second WD signal corresponding to sync data written in said sync subfield, and said third WD signal corresponding to said write data when said read/write gap is in said data subfield.

10. A recording/reproduction apparatus adapted to be able to use various types of medium drives, comprising:
    a first medium drive (MD) including first read/write means for selectively recording on a medium first recorded data corresponding to a write data (WD) signal input thereto, in response to a write gate (WG) signal input thereto and a first selection signal input thereto, and for selectively reading said first recorded data from said medium to generate a first read data (RD) signal corresponding to said first recorded data as a RD signal in accordance with a first write command;

a second MD including second read/write means for selectively recording on said medium second recorded data corresponding to said WD signal input thereto in response to said WG signal input thereto and a second selection signal input thereto, and for relatively reading said second recorded data from said medium to generate a second RD signal corresponding to said second recorded data as a RD signal in accordance with a second write command;

write gate signal generating means for selectively generating a first WG signal for said first MD and a second WG signal for said second MD in response to a sync signal input thereto to selectively output one of said first and second WG signals to said first and second MDs as said WG signal in accordance with a mode signal input thereto; and selection signal generating means for selectively outputting said first and second selection signals to said first and second MDs, respectively, in response to a selection signal generated in accordance with one of said first and second write commands.

11. The apparatus according to claim 10, further comprising sync signal generating means for generating said sync signal from said RD signal from one of said first and said second MDs.

12. The apparatus according to claim 10, wherein said write gate signal generating means comprises:
   timer means for generating first and second trigger signals in response to said sync signal;
   first WG signal generating means for generating said first WG signal in accordance with said first trigger signal from said timer means;
   second WG signal generating means for generating said second WG signal in accordance with said second trigger signal from said timer means; and
   selection means for selectively outputting one of said first WG signal from said first WG signal generating means and said second WG signal from said second WG signal generating means to said first and second MDs, in accordance with said mode signal.

13. The apparatus according to claim 12, further comprising:
   write data signal generating means responsive to said first and second WG signals from said write gate signal generating means and said mode signal, for selectively generating a first WD signal to output said generated first WD signal as said WD signal to said first MD, for selectively generating a second WD signal to output said generated WD signal as said WD signal to said first and second MDs, and for selectively generating a third WD signal from write data input thereto to output said generated third WD signal to said first and second MDs, said second WD signal being generated following generation of said first WD signal when said first WD signal is generated, and said third WD signal being generated following generation of said second WD signal.

14. The apparatus according to claim 13, wherein said write data signal generating means comprises:
   first register means for holding first data, and for selectively generating said first WD signal corresponding to said first data in response to a first output instruction input thereto to output said generated first WD signal as said WD signal to said first MD;
   second register means for holding second data, and for selectively generating said second WD signal corresponding to said second data in response to a second output instruction input thereto to output said generated second WD signal as said WD signal to one of said first and second MDs;
   first control means for selectively generating said first output instruction in response to said first WG signal and said mode signal to output said generated first output instruction to said first register means, and for generating a first output enable signal upon completion of said first WD signal;
   second control means for selectively generating said second output instruction in response to said second WG signal, said mode signal, and said first enable signal from said first control means to output said generated second output instruction to said second register means, and for generating a second output enable signal upon completion of said second WD signal; and
   data converter means for generating said third WD signal from said write data input thereto in response to said second output enable signal from said second control means to output said generated third WD signal as said WD signal to one of said first and second MDs.

15. The apparatus according to claim 13, wherein said write data signal generating means comprises:
   first register means for holding first data, and for selectively generating said first WD signal corresponding to said first data in response to a first output instruction input thereto and said mode signal to output said generated first WD signal as said WD signal to said first MD;
   second register means for holding second data, and for generating said second WD signal corresponding to said second data in response to a second output instruction input thereto to output said generated second WD signal as said WD signal to one of said first and second MDs;
   first control means for selectively generating said first output instruction in response to said first WG signal to output said generated first output instruction to said first register means, and for generating a first output enable signal upon completion of said first WD signal;
   second control mean for selectively generating said second output instruction in response to said second WG signal and said first output enable signal from said first control means to output said generated second output instruction to said second register means, and for generating a second output enable signal upon completion of said second WD signal; and
   data converter means for generating said third WD signal from said write data in response to said second output enable signal from said second control means and for outputting said generated third WD signal as said WD signal to one said first and second MDs.

16. The apparatus according to claim 10, further comprising mode signal supplying means for generating and outputting said mode signal to said write gate signal generating means in accordance with one of said first and second write commands.

17. The apparatus according to claim 10, wherein said first MD further comprises means for selectively generating a first mode signal in accordance with a first preset mode to output said first mode signal as said mode signal in accordance with said first selection signal; and wherein said second MD further comprises means for selectively generating a second mode signal in accordance with a second preset mode to output said second mode signal as said mode signal in accordance with said second selection signal.

18. The apparatus according to claim 10, wherein said medium is a magnetic disk, said first read/write means includes a first read/write head, and said first MD further comprises:

erase means having an erase head provided upstream of said first read/write head with respect to rotation of said magnetic disk, for erasing said first recorded data in response to an erase signal input thereto; and erase signal generating means for generating and outputting said erase signal to said erase means during a period when said WG signal is being input.

19. The apparatus according to claim 10, wherein said medium is a magnetic disk, said first read/write means includes a first read/write head, and said first MD further comprises:

erase means having an erase head provided upstream of said first read/write head with respect to rotation of said magnetic disk, for erasing said first recorded data in response to an erase signal input thereto; and erase signal generating means for generating said erase signal which becomes active at a same timing as said WG signal and becomes inactive earlier than said WG signal by a predetermined time, and for outputting said erase signal to said erase means.

20. A method of sharing various types of medium drives (MDs), comprising the steps of:

selecting one of the MDs and providing a mode signal in accordance with a write command;

generating a sync signal in response to data read out from a medium by the selected MD;

generating a different write gate (WG) signal corresponding to each of said MDs in response to said sync signal;

outputting, to said selected MD and in accordance with said mode signal, the one of said WG signals corresponding to said selected MD; and generating and outputting write data to said selected MD in accordance with said mode signal.

21. The method of claim 20 wherein the selecting step includes the substeps of:

generating a first selection signal in accordance with said write command; and decoding said first selection signal to generate a second selection signal for selecting the selected MD.

22. The method of claim 20 wherein the step of generating a different WG signal includes the substeps of:

generating, in response to said sync signal and at predetermined times, different trigger signals respectively corresponding to said different WG signals; and generating said different WG signals respectively in accordance with said different trigger signals.

23. The method of claim 20 wherein the step of providing a mode signal includes the substep of:

generating a selection signal in accordance with said write command;

outputting an MD mode signal from each of said MDs; and selecting one of said MD mode signals as said mode signal in accordance with said selection signal.

24. A method of sharing various types of medium drives (MDs) including a first MD that is different from a second MD, comprising the steps of:

selecting one of the MDs and providing a mode signal in accordance with a write command;

generating a sync signal in response to data read out from a medium by the selected MD;

generating a first write gate (WG) signal corresponding to the first MD and a second WG signal corresponding to the second MD in response to said sync signal;

selectively outputting, in accordance with said mode signal, the one of said first and second WG signals corresponding to the selected MD; and generating and outputting write data to said selected MD in accordance with the mode signal.

25. The method of claim 24 wherein said selecting step includes the substeps of:

generating a selection signal in accordance with said write command; and decoding said selection signal to generate either a first or a second selection signal for selecting said first or second MD, respectively.

26. The method of claim 24 wherein the step of generating said first and second WG signals includes the substeps of:

generating a first and a second trigger signal in response to said sync signal and at predetermined times; and generating said first and second WG signals in accordance with said first and second trigger signals.

27. The method of claim 24 wherein the step of providing a mode signal includes the substeps of:

generating a selection signal in accordance with said write command;

outputting a first and a second mode signal respectively from said first and second MDs; and selecting one of said first and second mode signals as said mode signal in accordance with said selection signal.

* * * * *